United States Patent [19]

Kocharian et al.

[11] 4,350,712
[45] Sep. 21, 1982

[54] FROZEN BEVERAGE STICK INCLUDING RETRACTABLE CUP

[76] Inventors: Alfred Kocharian, c/o George Spector 3615 Woolworth Bldg., 233 Broadway; George Spector, 3615 Woolworth Bldg., 233 Broadway, both of NY, N.Y. 10007

[21] Appl. No.: 233,153

[22] Filed: Feb. 10, 1981

[51] Int. Cl.³ .................. B65D 83/00; B65D 85/72
[52] U.S. Cl. .................................... 426/134; 426/91; 426/110; 426/592; 206/804; 229/1.5 B; 229/7 R; 220/93
[58] Field of Search .............. 426/91, 110, 134, 592, 426/95, 101, 111, 115, 130, 139, 524, 393, 330.4, 327; 401/81, 82, 153, 180, 143, 115, 117; 206/816, 817, 804, 527; 220/93, 90.2; 229/DIG. 6, DIG. 7, DIG. 13, 41 R, 7 R, 1.5 B; 222/386

[56] References Cited

U.S. PATENT DOCUMENTS

| | | | |
|---|---|---|---|
| 207,256 | 8/1878 | Crane | 401/117 |
| 308,965 | 12/1884 | Henderson | 406/393 |
| 1,213,961 | 1/1917 | Shepard | 220/90.6 |
| 1,253,917 | 1/1918 | Wern | 222/386 |
| 1,435,908 | 11/1922 | Muehl | 222/391 |
| 1,436,754 | 11/1922 | Chadwick | 426/110 |
| 1,742,157 | 12/1929 | Christian | 222/386 |
| 1,844,285 | 2/1932 | Johnson | 206/804 |
| 1,933,596 | 11/1933 | MacLean | 206/804 |
| 1,958,524 | 5/1934 | Tooker | 401/86 |
| 2,027,791 | 1/1936 | Schrager | 426/110 |
| 2,162,224 | 6/1939 | Legge | 426/134 |
| 2,356,874 | 8/1944 | Nageotte | 222/391 |
| 2,459,073 | 1/1949 | Hamilton | 229/1.5 B |
| 2,541,949 | 2/1951 | Thacker et al. | 222/391 |
| 2,729,956 | 1/1956 | Gilbert | 220/90.2 |
| 2,747,548 | 5/1956 | Platzke | 401/81 |
| 2,758,771 | 8/1956 | Bauer | 229/1.5 B |
| 2,868,361 | 1/1959 | Zilem | 206/804 |
| 3,036,702 | 5/1962 | Davis | 401/62 |
| 3,342,609 | 9/1967 | Bank et al. | 426/110 |
| 3,363,750 | 1/1968 | Smith | 229/1.5 B |
| 3,459,296 | 8/1969 | Berg | 426/134 |
| 3,481,458 | 12/1969 | Mayeaux | 206/804 |
| 3,920,156 | 11/1975 | Hicks | 401/82 |

FOREIGN PATENT DOCUMENTS

| | | | |
|---|---|---|---|
| 804425 | 4/1951 | Fed. Rep. of Germany | 401/82 |
| 2823320 | 12/1979 | Fed. Rep. of Germany | 426/134 |
| 175176 | 2/1922 | United Kingdom | 401/153 |
| 593203 | 10/1947 | United Kingdom | 401/82 |

Primary Examiner—Steven L. Weinstein

[57] ABSTRACT

A popsicle type confection, which instead of an orange, cherry, raspberry, strawberry or similar conventional flavor frozen ice upon a stick, utilizes either a frozen beer or a frozen wine mounted upon a stick, and which in the present invention also includes a cup like heat shield around confection which is retractable so to allow licking the frozen beer or wine.

1 Claim, 6 Drawing Figures

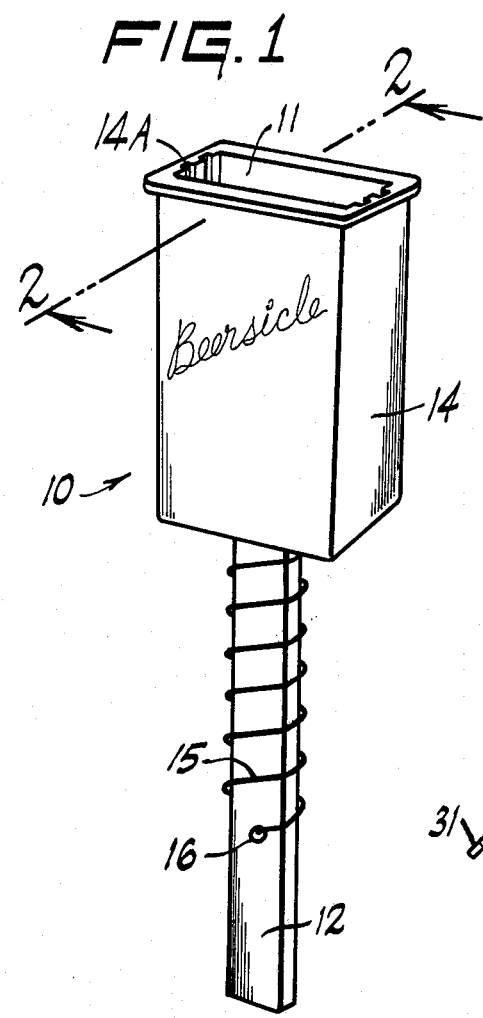
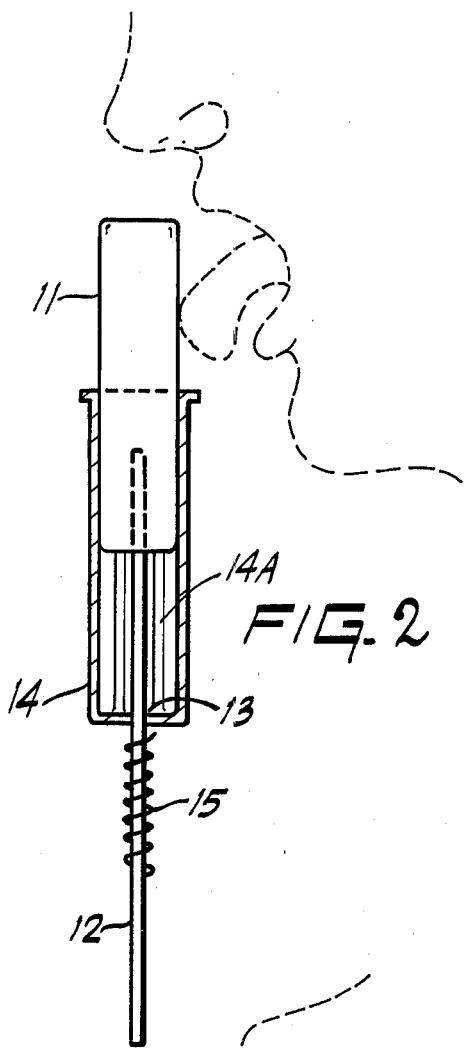
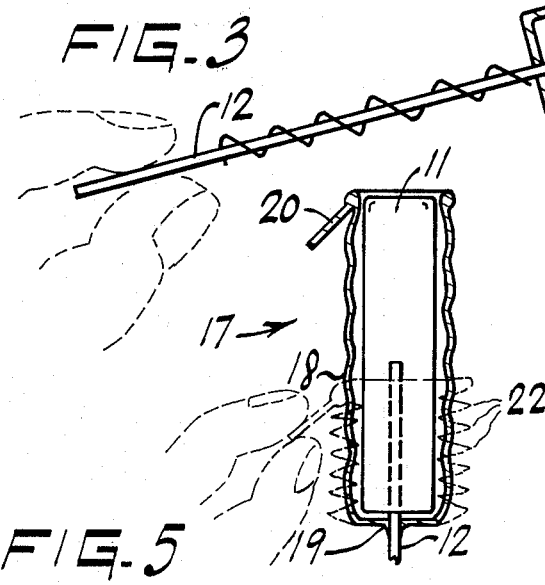
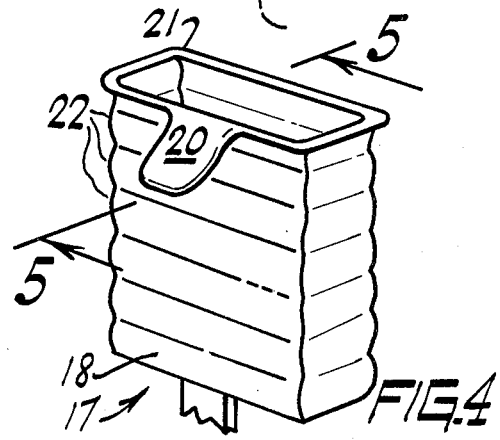

FROZEN BEVERAGE STICK INCLUDING RETRACTABLE CUP

This invention relates generally to frozen confections.

A principal object of the present invention is to provide a popsicle type confection for pleasing adults who are fond of beer or wines, and which would be particularly desirable on hot summer days.

Another object is to provide a beer or wine which is frozen upon a stick so that it can be held in a hand and licked with a tongue.

Still another object is to provide a beer stick or wine stick that additionally includes a cup like, retractable shield so to protect the confection from hot air melting the same, and which can serve to catch any that does melt so to not drip on a person, and which allows drinking therefrom all that has melted thereinto.

FIG. 1 is a perspective view of the beer stick or wine stick.

FIG. 2 is a cross section on line 2—2 of FIG. 1 and showing the shield retracted in order to allow licking the beer stick.

FIG. 2A is a cross section similar to FIG. 2 with modifications thereto.

FIG. 3 is a cross section showing the shield used as a cup for drinking up any beer that melted off the stick.

FIG. 4 shows another design of the invention in which the shield is of very thin plastic and is accordian pleated so to fold downward in order to expose the bear stick for licking, and the shield including a tab for pulling the shield into collapsed or extended positions.

FIG. 5 is a cross section on line 5—5 of FIG. 4, and showing in dotted lines the device in collapsed position.

Referring now to the drawing in greater detail, and more particularly to FIGS. 1 to 3 thereof at this time, the reference numeral 10 represents a beer stick or wine stick according to the present invention wherein there is either a beer or wine that is frozen into a solid bar 11 and which is mounted upon one end of a flat stick 12. The stick is inserted through a correspondingly shaped hole 13 in a bottom of a rigid plastic cuplike shield 14 that fits around the solid bar 11 so to protect it from hot air to melt the same. A compression coil spring 15 is shaped to fit around the flat stick and bears at one end against a bottom of the shield while the other end of the spring is secured in an hole 16 through the stick, so to normally urge the shield to be slid up around the solid bar.

When desiring to lick or bite the beer or wine solid, the shield is simply slid down against the spring so to be out of the way, as shown in FIG. 2.

Any beer or wine that melts will drip down into the cup like shield so that after the frozen portion is consumed a person can thereafter drink up whatever has melted directly from the shield, as shown in FIG. 3.

Grooves 14a are provided to facilitate drinking the liquid and retracting the shield.

In FIG. 2A, wedgeshaped portions 32 are provided to form retaining shoulders which coact with the flexible bottom of the shield 14 to retain the shield in successive retracted positions as the bar 11 is consumed. A compression spring 33 coiled about the portions 32 to bias the shield upward thus preventing inadvertant sliding of the shield downward. Tabs 31 are provided for forcing manually the shield downward.

In FIGS. 4 and 5, a modified design 17 of the invention includes the frozen beer or wine solid 11 bar being mounted on a stick 12 as above described but wherein a cup like shield 18 is made of thin, resilient plastic that is accordian pleated all around, horizontally. The stick inserted through hole 13 is not slidable therein due to the shield being molded solidly thereagainst as shown at 19, so that the above described spring 15 is not needed here thus there is additional security against any liquid leaking through the hole.

In use, the shield is retractable by pulling down a tab 20 on the lip 21 of the shield so to cause accordian pleat 22 to contract as shown by the lines in FIG. 5, so to allow a person to lick the beer or wine.

What is claimed:

1. A frozen beverage stick, comprising in combination a liquor frozen into a solid bar upon one end of a flat stick, a cup shaped shield around said solid, said shield having a hole in a flexible bottom thereof through which said stick extends, said hole in said flexible bottom of said shield corresponding in shape to the cross-section of said stick, said stick including means for retracting and retaining the shield in a plurality of sealed positions exposing sides of said solid bar in order that it may be consumed progressively wherein said means for retracting comprise said shield being slidable on said stick against one end of a compression coil spring around said stick, said compression coil spring being positioned on said flat stick and being shaped to fit around the flat stick and having one end of the spring bearing against said flexible bottom of said shield and the other end of the spring secured to said flat stick, said shield including grooves along its inner surface to facilitate drinking the beverage when melted and to facilitate retracting the shield and wherein said means for retaining comprise successive wedges on said stick below said hole providing spaced shoulders to retain the shield in various retracted positions said spring being coiled about said wedges such that said flexible bottom is abutted by said coils sealingly against said shoulders in said retracted positions to firmly bear against said shoulders preventing downward slippage and leakage, further including an enlarged opening at the top of said shield for drinking purposes, in further combination with external tabs on said shield for manually forcing the shield downward.

* * * * *